Nov. 30, 1965  W. H. BURKEY  3,220,446
BAND SAW GUIDE
Filed Dec. 20, 1963  2 Sheets-Sheet 1
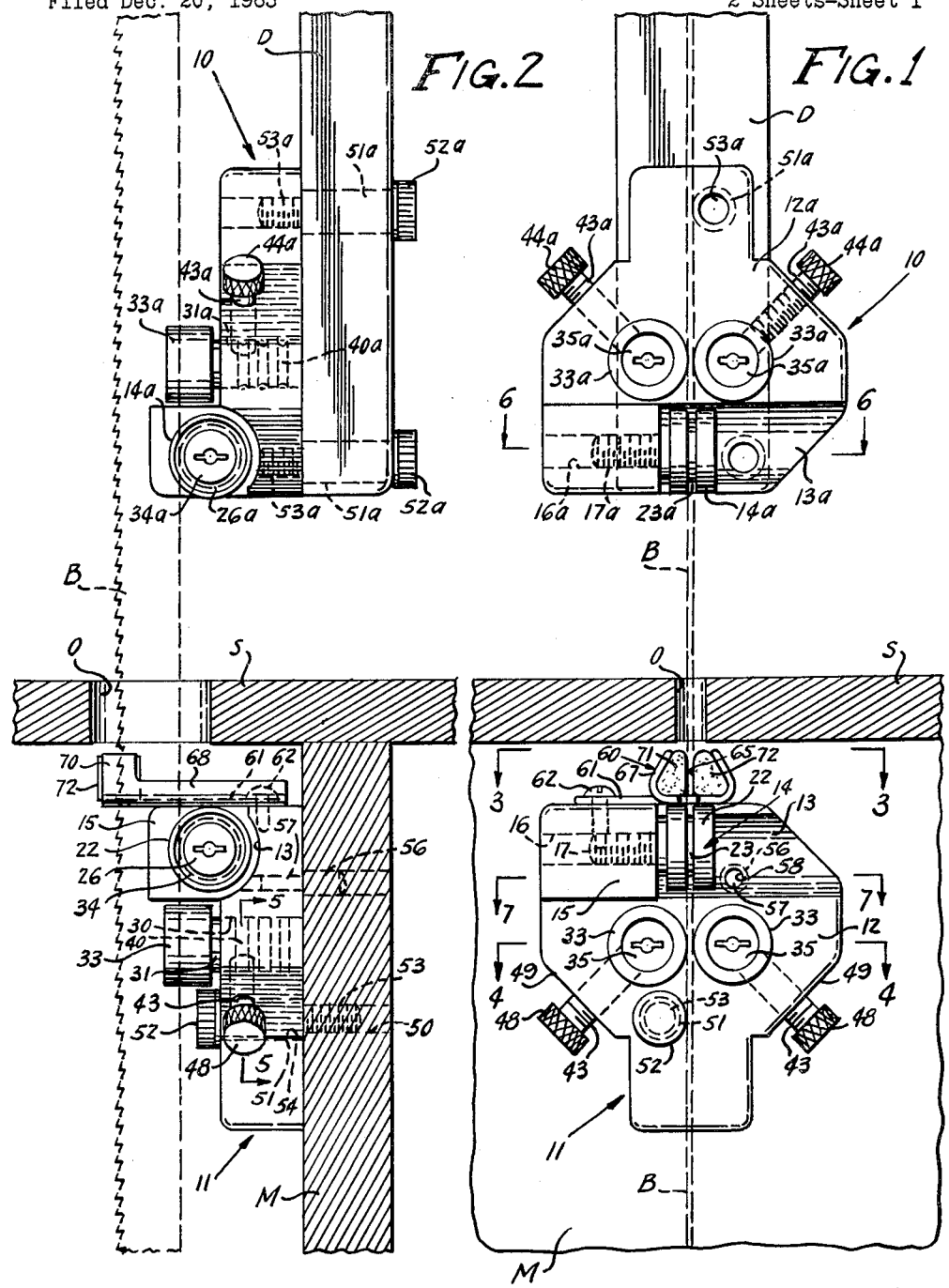
INVENTOR.
WALTER H. BURKEY
BY
Kimmel & Crowell
ATTORNEYS.

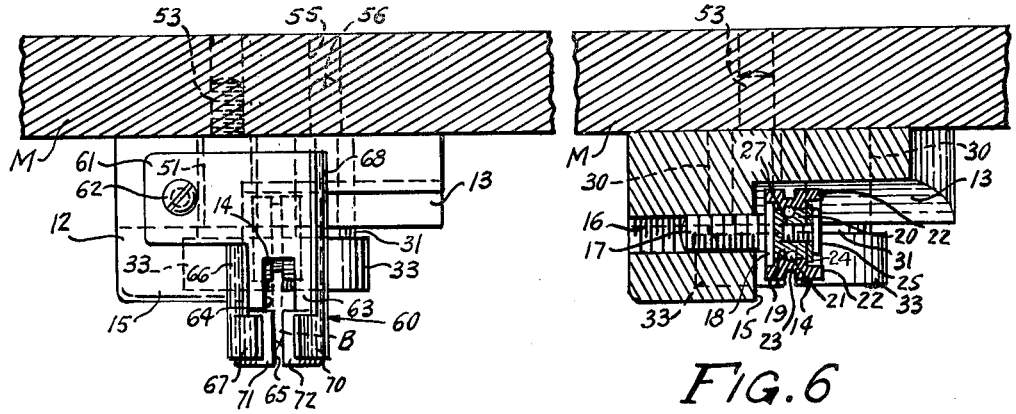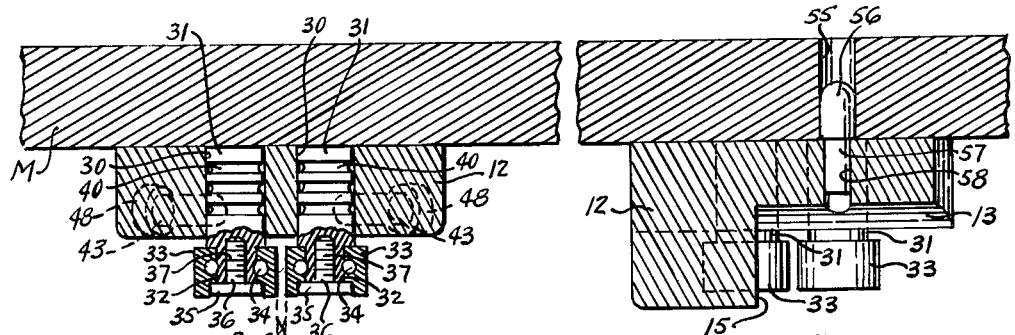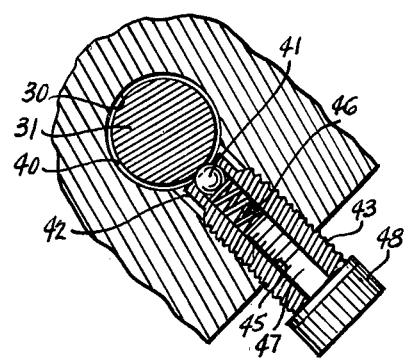

United States Patent Office 3,220,446
Patented Nov. 30, 1965

3,220,446
BAND SAW GUIDE
Walter H. Burkey, 613 Janet Ave., Lancaster, Pa.
Filed Dec. 20, 1963, Ser. No. 332,066
4 Claims. (Cl. 143—162)

This invention relates to a band saw guide and has as its primary object the provision of an improved band saw guide characterized by linearly movable side guide rollers or wheels which may be readily positioned to accommodate varying thicknesses of band saw blades.

An additional object of the invention is the provision of a band saw guide of this character wherein the back guide rollers are positioned as close to each other as possible, to minimize possible breakage of the blade due to inadequate support.

A further object of the invention is the provision of a band saw guide provided with an integral wiper which maintains the blade in a clean relation throughout its work cycle.

Still another object of the invention is the provision of improved means facilitating the linear adjustment of the side rolls whereby such adjustment may be effected with a minimum of effort and difficulty.

Still another object of the invention is the provision of an improved band saw blade guide which is sturdy and durable in construction, reliable and efficient in operation, and relatively simple and inexpensive to manufacture, assemble, and utilize.

Other objects will in part be obvious and in part be pointed out as the description of the invention proceeds and shown in the accompanying drawings wherein there is disclosed a preferred embodiment of this inventive concept.

In the drawings:

FIGURE 1 is a front elevational view of a band saw guide constructed in accordance with the instant invention.

FIGURE 2 is a side elevational view thereof.

FIGURE 3 is a sectional view taken substantially along the line 3—3 of FIGURE 1 as viewed in the direction indicated by the arrows.

FIGURE 4 is a sectional view taken substantially along the line 4—4 of FIGURE 1 as viewed in the direction indicated by the arrows.

FIGURE 5 is an enlarged sectional view taken substantially along the line 5—5 of FIGURE 1 as viewed in the direction indicated by the arrows.

FIGURE 6 is a sectional view taken substantially along the line 6—6 of FIGURE 1 as viewed in the direction indicated by the arrows.

FIGURE 7 is a sectional view taken substantially along the line 7—7 of FIGURE 1 as viewed in the direction indicated by the arrows; and FIGURE 8 is a side elevational view of a constructional detail.

Similar reference characters refer to similar parts throughout the several views of the drawing.

Having reference now to the drawings in detail, the band saw blade guide of the instant invention is comprised of an upper guide element or body generally indicated at 10 and a lower guide element or body generally indicated at 11. The guides 10 and 11 are similar in many respects and contain similar elements, which elements will hereinafter be described only in conjunction with one of the elements.

Having reference now more particularly to the lower guide body 11, the same is comprised of a block portion 12, which has adjacent its upper end an arcuate transverse cutaway groove 13, within which is mounted a backing roller 14. The cutaway portion 13 terminates in a shoulder 15 which has a transverse threaded bore 16 cut therein, in which is seated a screw 17 which carries a flange 18 and a circumferential head 19 as best shown in FIGURE 6. The backing roller 14 includes a hub 20 which carries bearings 21 about the periphery thereof, within which head 19 may be rotated and also includes a pair of oppositely disposed flanges 22, between which is a blade groove 23. A friction disc 24 is mounted on the outer face of circumferential head 19, and contains a central bore to accommodate a threaded stud 25 having a head 26 which extends into a threaded bore 27 in circumferential head 19 for holding the backing wheel 14 in related assembly.

Below the cutaway portion 13 the lower body is provided with a pair of spaced apart smooth bores 30 which extend entirely therethrough, and within which are positioned a pair of studs 31, each of which has a reduced external head 32. The reduced heads 32 are surrounded by side guide rollers or wheels 33, which are provided with roller or needle bearings 34, and which are secured in position by the enlarged heads 35 of screws 36 which engage in threaded bores 37 extending into the reduced heads 32.

The side guide rollers 33 are adapted to engage the sides of the saw blade B, as the same is directed by the backing wheel therebetween.

Each of the studs 31 is linearly movable in its associated bore and is provided with a series of annular rounded grooves 40. A selected one of the grooves is adapted to be engaged by a ball detent 41, which is contained interiorly of the reduced tip 42 of a threaded holding screw 43. The tip of the detent is provided with a flange 44 to retain the ball therein, and a hollow bore 45 interiorly of the screw 43 contains a spring 46 which in turn is held in position by the threaded shank 47 of a screw which engages internal threads in the bore 45. The screw 47 is provided with a head 48 which extends exteriorly of an angularly cutaway portion 49 of the body 11, and which permits ready adjustment of the pressure exerted on and by the ball 41. When it is desired to adjust the relative position of the side guide rolls 33 it will be readily apparent that such adjustment may be effected merely by pulling or pushing the guide wheels 33 in such manner as to move them inwardly or outwardly relative to their associated bores, the ball 41 selectively engaging one of the grooves 40 as the position of the studs is varied.

The lower body 11 is mounted beneath the blade opening O in the work support or table F preferably on a depending member M which is suitably secured beneath the table. The member M is provided with a threaded bore 50 into which extends the reduced threaded end 53 of a holding member which includes a head 52 and a smooth shank 51 as best shown in FIGURE 8. The smooth shank 51 engages in a corresponding smooth bore 54 suitably located in the body 11. The member M is provided with an additional bore 55 into which extends a smooth pin 56 having a reduced end portion 57 which engages loosely in a bore 58 in the body 12 which opens into the cutaway portion 13 thereof, the relatively loose fit providing a minute amount of flexibility in the mounting, which in the event of momentary twisting of the blade or bending thereof occasioned by resistance in the work, will prevent breakage of the blade.

A blade wiping element generally indicated at 60 is positioned on top of the lower unit or body 11 and consists of a plate 61 which is secured in position by means of a screw 62 on top of body 12. The plate 61 has a right angularly offset portion 63 which has a rectangular blade accommodating cutout 64 centrally positioned therein which terminates in a slot 65 through which the blade passes. The extending portion 63 has a flange 66 upturned on one side and terminating in an elongated portion 67 while the end has a similar upturned flange 68 terminating in an extending portion 70. The extending portions 67 and 70 serve to retain felt blocks 71 and 72 which are juxtaposed on either side of the blade, and between which the blade passes to be moistened after passing through the opening O.

The upper unit 10 is identical to the lower unit 11 in many respects, and comprises a block or unit 12a which is substantially identical in configuration to the block 12 but reverse, and which includes a cutaway portion 13a in which there is mounted a backing roll 14a provided with a central groove 23a and mounted on a stud 17a in a bore 16a, the mounting being identical to that of backing wheel 14 previously described. A pair of side guide rolls or wheels 33a are held in position by the heads 35a of screws which engage in studs identical to the previously described studs 31 and having similar grooves therein. The studs are held in position by spring pressed balls detents in hollow screw members 43a provided with heads 44a identical to the previously described members 43 and 44. The arrangement is thus such that the guide mechanism for the blade above the work support is identical to but inverted relative to the lower unit. It is to be noted that the backing wheels 14a and 14 are substantially as closely juxtaposed as possible while still allowing clearance for the work on the support S. Backing wheel 14a is, as shown in FIGURE 2, held in position by the head 34a of the screw identical to 34 which seats on a disc 26a identical to the disc 26.

The upper unit 12a is mounted on a depending support D by means of a pair of members which include smooth shanks 51a, heads 52a, and threaded reduced portions 53a identical to the screws 51, 52, and 53, which engage the upper block in substantially the same relative positions as the previously described screw member 53 and the related pin 56, 57. The upper member is thus inflexibly supported and serves to guide the blade accurately through the opening O and through the lower guide member 12. As best shown in FIGURE 2, the side guide wheels 33a are mounted on shanks or studs 31a identical to the studs 31 and provided with identical grooves 40a identical to the grooves 40.

In the use and operation of the device it will be seen that the blade B is effectively backed by the backing rolls 14 and 14a and guided laterally by the guide rolls 33 and 33a. It will also be seen that both the rolls 33 and 33a may be moved linearly relative to their associated bores to accommodate varying widths of blades B. It will also be seen that the ball detents may be tightened by suitable rotation of the heads 44 and 44a, and that the wiper pads 71 and 72 effectively maintain the blade in clean condition during use.

From the foregoing it will now be seen that there is herein provided an improved band saw blade guide which accomplishes all of the objects of this invention, and others, including many advantages of great practical utility and commerical importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. A band saw guide blade comprising an upper body and a lower body adapted to be mounted above and below a work support respectively and adjacent a saw slot therethrough, said upper body having a cutaway portion adjacent its lower side and said lower body having a cutaway portion adjacent its upper side, the end of each cutaway portion having a threaded bore therein, a screw having a flange and a smooth circumferential head mounted in each bore, bearing means carried by said heads, a backing wheel having an annular groove adapted to abut the back edge of a band saw blade rotatably mounted on said bearing means on said smooth head, screw means securing said backing wheel on said head, a pair of studs extending from each said body above said cutaway portion of said upper body and below said cutaway portion of said lower body respectively, said studs extending transversely of the axis of said screw and being spaced apart, a bearing on the end of each stud, a guide wheel mounted on each bearing, means permitting adjustment of said studs linearly to vary the position of said guide wheels in accordance with the width of the band saw blade, and means securing said studs in a selected position of adjustment.

2. The structure of claim 1 wherein each said body is provided with a smooth bore into which each stud extends, each stud is provided with a plurality of annular grooves, each body is provided with a radial threaded bore intersecting its smooth bore, a hollow screw extends into each threaded bore, and a spring pressed ball in each hollow screw engageable in a selected groove in its associated stud comprises the means securing the stud in a selected position of adjustment.

3. The structure of claim 2 wherein said lower body is provided with a blade wiping element positioned above the cutaway portion thereof adjacent its backing wheel.

4. The structure of claim 3 wherein said blade wiping element comprises a plate secured to the top of said lower body, an offset extremity on said plate having a slot therethrough aligned with the annular groove in the backing wheel, upwardly and inwardly extended flanges on opposite sides of said slot, and felt wipers constrained by said flanges on opposite sides of said slot adapted to contact and wipe the blade.

References Cited by the Examiner
UNITED STATES PATENTS

| | | | |
|---|---|---|---|
| 2,152,906 | 4/1939 | Miller | 143—162 |
| 2,670,767 | 3/1954 | Miller | 143—162 |

WILLIAM W. DYER, Jr., *Primary Examiner.*

W. D. BRAY, *Assistant Examiner.*